(12) United States Patent
Tolle et al.

(10) Patent No.: US 7,583,066 B2
(45) Date of Patent: Sep. 1, 2009

(54) METHOD OF OPERATING A DC/DC UP/DOWN CONVERTER

(75) Inventors: Tobias Georg Tolle, Turnhout (BE); Ferdinand Jacob Sluijs, Nijmegen (NL); Henricus Cornelis Johannes Büthker, Mierlo (NL); Matthias Walther, München (DE)

(73) Assignee: NXP B.V., Eindhoven (NL)

( * ) Notice: Subject to any disclaimer, the term of this patent is extended or adjusted under 35 U.S.C. 154(b) by 155 days.

(21) Appl. No.: 10/585,059

(22) PCT Filed: Dec. 22, 2004

(86) PCT No.: PCT/IB2004/052900

§ 371 (c)(1),
(2), (4) Date: Apr. 24, 2007

(87) PCT Pub. No.: WO2005/074112

PCT Pub. Date: Aug. 11, 2005

(65) Prior Publication Data

US 2007/0273337 A1  Nov. 29, 2007

(30) Foreign Application Priority Data

Jan. 5, 2004  (EP) .................................. 04100006

(51) Int. Cl.
*G05F 1/577* (2006.01)
*G05F 1/10* (2006.01)

(52) U.S. Cl. .......................... 323/267; 323/222; 323/285

(58) Field of Classification Search ................. 323/222, 323/225, 267, 271, 272, 282, 284, 285, 299, 323/301
See application file for complete search history.

(56) References Cited

U.S. PATENT DOCUMENTS

| 5,617,015 | A | 4/1997 | Goder et al. |
| 5,751,139 | A * | 5/1998 | Jordan et al. ................. 323/222 |
| 6,437,545 | B2 | 8/2002 | Sluijs |
| 6,437,917 | B1 | 8/2002 | Ooshima et al. |
| 6,900,620 | B2 * | 5/2005 | Nishimori et al. ............ 323/222 |
| 7,176,661 | B2 * | 2/2007 | Kranz ......................... 323/222 |
| 7,298,116 | B2 * | 11/2007 | Sluijs ......................... 323/222 |
| 2002/0113580 | A1 | 8/2002 | Sluijs |
| 2003/0086279 | A1 * | 5/2003 | Bourdillon ............... 363/21.12 |

* cited by examiner

*Primary Examiner*—Jessica Han
(74) *Attorney, Agent, or Firm*—Robert Iannucci; Seed IP Law Group PLLC (57) ABSTRACT

A method for an up-down converter which is based on a buck converter during the current down-conversion phase ($\Phi_2$, $\Phi_3$ and $\Phi_5$, $\Phi_6$, respectively) of the coil ($L_1$) supplies an output (B) with a relatively high output voltage ($U_B$), where $U_B > U_{in}$. The down-conversion phase of the coil current ($I_{L1}$) comprises at least two different down-conversion phases ($\Phi_2$, $\Phi_3$ and $\Phi_5$, $\Phi_6$, respectively). A method for an up-down converter, which converter is based on a boost converter, supplies during the current up-conversion phase ($\Phi_7$, and $\Phi_{10}$, respectively) of the coil ($L_2$) an output (D) which has a relatively low output voltage ($U_D$) with power, where $U_D > U_{in}$. The up-conversion phase of the coil current ($I_{L2}$) comprises at least two different current reduction phases ($\Phi_7$, $\Phi_8$ and $\Phi_{10}$, $\Phi_{11}$, respectively).

16 Claims, 4 Drawing Sheets

METHOD OF OPERATING A DC/DC UP/DOWN CONVERTER

The invention relates to DC/DC converters with various outputs, which converters are up converters as well as down converters and are called up/down converters here. DC/DC up/down converters generate output voltages which are situated above, below or on the level of the input voltage.

Converters are known from practice which are both up and down converters, but which require a multiplicity of transistors or switches of different types and are therefore relatively expensive. Also known are down converters and up converters with various outputs which, however, cannot simultaneously provide a high and a low output voltage.

A buck converter (down converter) and a boost converter (up converter) are in essence different by the arrangement of the storage means for the inductive energy, for example, a coil or reactor (in the following only referred to as coil). With the buck converter the main switching means is arranged between one pole of the DC voltage source that generates the input voltage and the coil, whereas with the boost converter the coil is directly connected to the one pole of the DC voltage source that generates the input voltage and the main switching means between the other end of the coil and the other pole of the DC voltage source. With respect to the application, the difference lies in the height of the main voltage having the highest load. With the buck converter the main voltage having a high load is lower than the input voltage, whereas with the boost converter the main voltage having a high load is higher than the input voltage.

US2002/0113580 A1 discloses a DC/DC up/down converter which comprises inductive energy storage means, switching means and control means. These control means are arranged for operatively controlling the switching means so that electrical energy is transferred to a first output of the DC/DC converter in a down-conversion mode (buck conversion) and electrical energy is transferred from the first output to a second output of the DC/DC converter in an up-conversion mode (boost mode). This arrangement is disadvantageous in that a load which is to be transferred to the second output, is to pass the inductive energy storage means twice and in this manner high losses are to be taken in their stride. In addition, the output capacitor of the first output is to buffer the load, which leads to an increased output voltage ripple of the first output.

Furthermore, this converter has exactly two outputs, a first one with a voltage below the input voltage and a second one with a voltage above the input voltage. In order to realize this up/down converter, only three switching means are necessary. For many electronic appliances, however, more than two supply voltages are needed. The converter disclosed in US 2002/0113580 A1 is not sufficient for such appliances.

Figure 6:
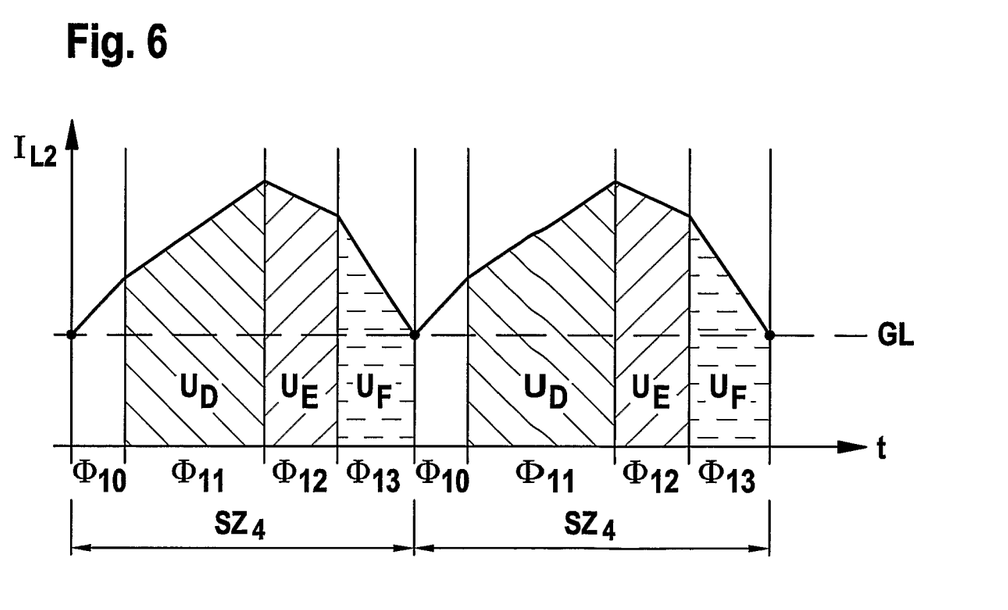

U.S. Pat. No. 6,437,545 B2 discloses a control diagram for an up/down counter in FIG. 6 having a plurality of outputs. This DC/DC converter comprises inductive energy storage means, switching means and control means, said control means being arranged for selectively controlling the switching means so that electrical energy is transferred to an output. The control means are arranged for controlling the various outputs in that they render a number of individual switching cycles available for each output and also provide a main output among said plurality of outputs, which main output requires the most energy. This controller provides a switching sequence of different switching cycles in which each switching cycle starts with a phase $\Phi_1$ at which all the switches that are assigned to one of the outputs, are open and the main switch, which is connected in series with the coil between the plus pole and the minus pole of the input voltage, is closed. During the phase $\Phi_1$, energy is up-converted in the coil, because no further consumer is included in the current circuit. Further to the current up-conversion there is a phase in which one of the switches, which are assigned to one output each, is closed, so that the energy is down-converted again in the coil. When the current flowing through the coil has again reached the value it had at the beginning of the up-conversion phase and thus a balance is re-established, again a current up-conversion phase $\Phi_1$ begins with a subsequent current down-conversion over exactly one load branch. A switching sequence thus comprises a plurality of consecutive switching cycles, so that a down-conversion phase follows an up-conversion phase. The up/down converter described there and shown in its FIG. 6 is arranged for only two outputs and has one switching means each (S4, S5) for the two outputs and also a main switching means (S1), a freewheeling switching means (S2) and a further switching means (S3), which is arranged between the coil output facing the converter outputs and the pole not connected to the main switching means, which pole is assigned to the DC voltage source which generates the input voltage, and which further switching means (S3) is open in the buck mode, but is necessary for the boost mode. In this way, in addition to the switching means controlling the current distribution over the various output branches (D2, S4, S5), a total of 3 switching means (D1, S4, S3) are necessary.

It is an object of the invention to provide a most cost-effective method of operating a DC/DC up/down converter which has at least two outputs. One of the two outputs can be higher than the input voltage and, simultaneously, one can be lower than the input voltage.

Methods according to the invention are provided both for up/down converters which are structured based on a buck converter and for those based on a boost converter.

The object is achieved by a method defined in claim 1 which relates to a what is called buck converter. With the method according to the invention, and with a buck converter, the energy stored in the coil in the course of a switching cycle is also used for supplying an output voltage that exceeds the input voltage. In this context a switching cycle is understood to mean a sequence of switching phases which, in turn, correspond to defined states of the switching means. A switching cycle in principle comprises an up-conversion phase and a subsequent down-conversion phase of the respective coil current, which current flows through the inductive energy storage means. The up-conversion phase and/or the down-conversion phase are then subdivided into two or more phases. One phase stands for a certain combination of the states of all the switching means. The invention is then based on the recognition that by a suitable distribution of the load of the inductive storage means over all outputs, the further switching means and its control of the U.S. Pat. No. 6,437,545 B2 forming the state of the art may be dispensed with and in this way the circuit arrangement can be realized more cost-effectively.

The method defined in claim 1 can be expanded for further outputs in an extremely simple way. As an alternative, the switching cycle is subdivided into a further switching phase, which relates to this additional output or an existing switching phase can alternately be used for consecutive switching cycles for one or the other output, so that as it were two outputs are operated in a toggling fashion.

The control means preferably generates switching phases for each switching means, which phases are structured so that the down-conversion phase of the coil current has at least two switching phases. With exactly two switching phases during the down-conversion phase this means that the corresponding DC/DC up/down converter has exactly two outputs and all (both) outputs consecutively receive a load during a switching cycle. Exactly two outputs in this case is understood to mean one output with a low voltage and one output with a high voltage compared to the input voltage, respectively.

With three switching phases during the down-conversion phase this means that the corresponding DC/DC up/down converter has three outputs and all (three) outputs consecutively receive a load during a switching cycle.

In accordance with one embodiment a switching cycle has exactly all switching phases once.

The object is also achieved by means of a method defined in claim 4, which relates to a what is called boost converter. In this method according to the invention, during the storing of energy in the coil there is also a phase in which an output voltage is produced which is below the input voltage level. The up-conversion phase and/or the down-conversion phase of the coil current is then subdivided into two or more phases. A phase stands for a certain combination of the states of all the switching means. The method according to the invention makes it possible to save on the switching means S1 and S2 referred to in the state-of-the-art FIG. 6 of U.S. Pat. No. 6,437,545 B2. In this way the circuit arrangement can be realized more cost-effectively.

The control means preferably generates switching phases for each switching means, which switching phases are built-up so that the up-conversion phase of the coil current has at least two switching phases. In at least one of these switching phases an output that has a lower voltage than the input voltage receives a load. In the current down-conversion phase (s) the output(s) whose voltages exceed the input voltage are provided.

The method defined in claim 4 can be expanded for a further output in a particularly simple manner. For this purpose, the switching cycle is alternatively subdivided into a further switching phase which relates to this additional output, or a switching phase is alternately used for consecutive switching cycles for one or the other output, so that a quasi-toggling operation of two outputs is the result.

Implementing this method a number of times may create the possibility of adding any number of outputs.

In accordance with one embodiment, one switching cycle includes all the switching phases exactly once.

The switching means may be MOSFETs (Metal-Oxide Semiconductor Field-Effect Transistors), IGBTs (Insulated Gate Bipolar Transistors), GTOs (Gate Turn-Off switches), bipolar transistors or any other transistors or switches. They are preferably MOSFETs, because then the up/down counter according to the invention can be realized in a particularly simple manner.

The DC/DC converter according to the invention is suitable for use in electronic appliances in which consumers are to be supplied with different voltages for example, in mobile radio telephones, PDAs (Personal Digital Assistants) or MP3 players.

These and other aspects of the invention are apparent from and will be elucidated with reference to the embodiments described hereinafter.

Figure 1:
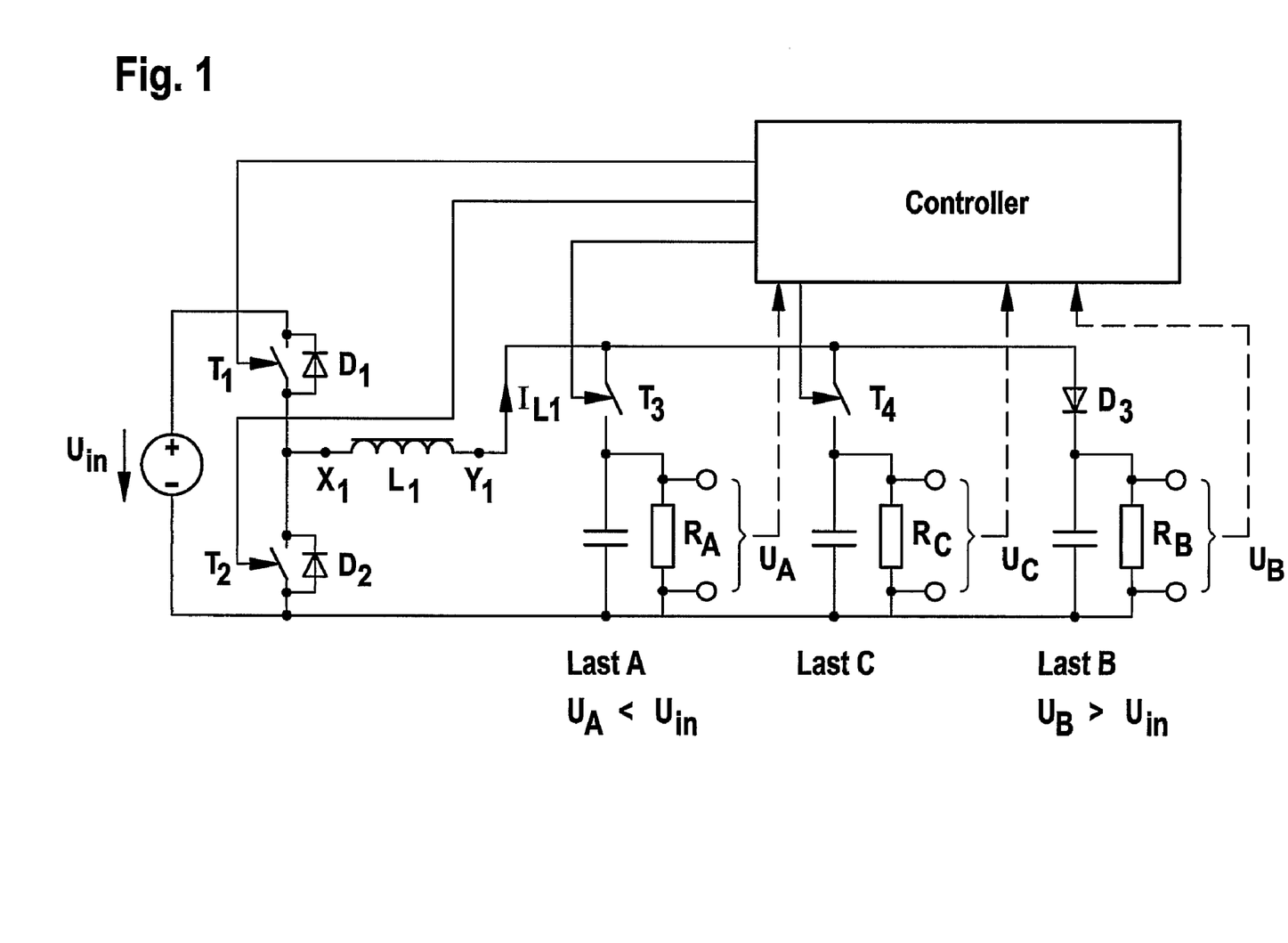
FIG. 1 shows a diagrammatic circuit arrangement for a buck converter.

FIG. 1 shows a diagrammatic circuit arrangement for an up/down counter based on a buck converter. A switching means $T_1$, which is arranged between a plus pole of the DC voltage source generating an input voltage $U_{in}$ and a coil $L_1$ used as an energy storage means, is used as a main switch which either switches the input voltage on or off. A first diode $D_1$ is arranged parallel to the switching means $T_1$, so that the anode of the first diode $D_1$ is aligned to the coil $L_1$ and can discharge when the switching means $T_1$ is open, if the potential at $X_1$ of the coil $L_1$ is higher than that of $U_{in}$. The up/down counter shown in this example and having a plurality of outputs has three outputs A, B and C, the main voltage being the voltage $U_A$ that is lower than the input voltage $U_{in}$ and has the largest load in the switching circuit. A coil current $I_{L1}$ is supplied to this branch of the switching circuit via a switching means $T_3$. A voltage $U_B$, which exceeds the input voltage $U_{in}$, is available at an additional output. This branch of the switching circuit need not comprise a controllable switching means, but as the case may be, a diode $D_3$, which is connected in series to the output $U_B$, will be sufficient. The branch relating to the load C only represents, for example, a possibility of extending the up/down counter according to the invention. The height of the voltage $U_C$ present on this output or the load C to be provided is not further defined here because, ultimately, it is a matter of balance of all the loads concerned. A controller monitors the output voltages $U_A$, $U_B$, $U_C$ and controls the switching means $T_1$, $T_2$, $T_3$, $T_4$ in accordance with the requirements.

The coil $L_1$ picks up $F_2$ at the end $X_1$ assigned to the input voltage between the main switching means $T_1$ and the free-wheeling switching means $D_2$. The average voltage at $X_1$ is set by the duty cycle of the main switching means $T_1$.

The switch $T_2$ is optional. For the function of the converter it is essential for the coil current $I_{L1}$ to be able to flow in the lower branch via the second diode $D_2$ to the coil $L_1$ when the main switching means $T_1$ is open. The diode $D_2$ is connected with its anode to one of the poles, here the minus pole, of the DC voltage source which generates the input voltage $U_{in}$ and with its cathode aligned to the switch-directed end of the coil $L_1$. Since it is also possible for losses to occur at the diode $D_2$ in forward conduction, in parallel thereto a switching means $T_2$ may be arranged to reduce the forward losses.

Figure 2:
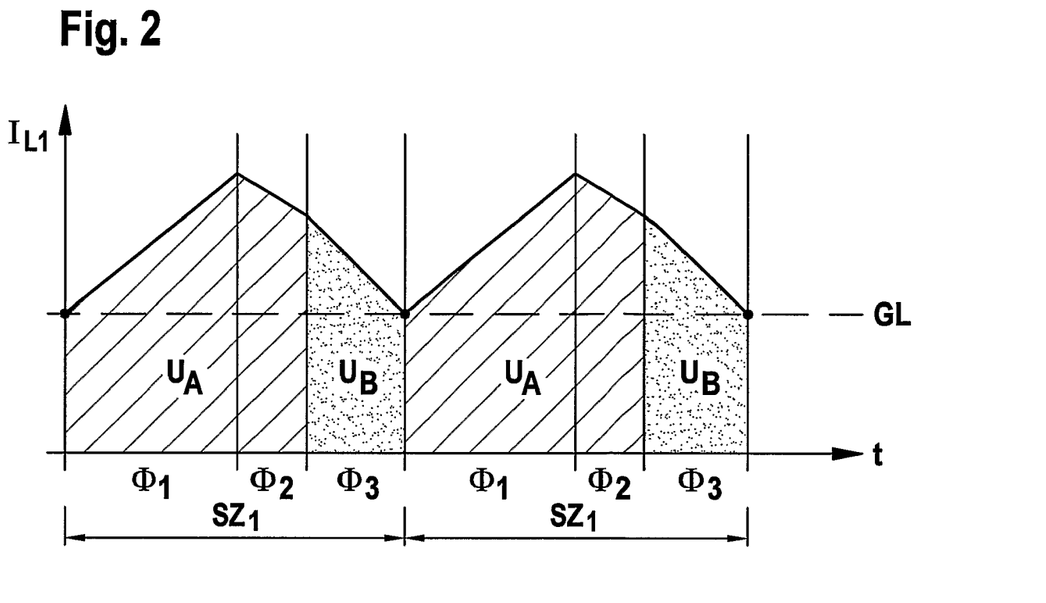
FIG. 2 is a diagram relating to the coil current in accordance with a first variant of a circuit diagram for a buck converter.

FIG. 2 is a diagram which relates to the coil current $I_{L1}$ in accordance with a first variant according to the invention of a circuit diagram for a Buck converter. In the first circuit diagram a switching cycle $SZ_1$ comprises an up-conversion phase of the coil current $I_{L1}$ and a consecutive multiphase (here bi-phase) down-conversion phase. The balance line GL indicates that with a suitable duty cycle of the main switching means $T_1$ the coil current $I_{L1}$ at the beginning and at the end of the switching cycle $SZ_1$ has the same value. If the load of the outputs with a high output voltage increases too much, no balance can be set and the balance line is abandoned. The switching cycle $SZ_1$ represented here comprises a plurality of phases $\Phi_1$, $\Phi_2$, and $\Phi_3$ which correspond to the following states of the switching means $T_1$, $T_2$, $T_3$ and $T_4$:

$\Phi_1$: $T_1$ and $T_3$ are closed, $T_4$ is open. The optional switching means $T_2$ is open. The coil current $I_{L1}$ increases and simultaneously supplies power to output A.

$\Phi_2$: $T_1$ is open, $T_3$ and the optional switching means $T_2$ is closed. Part of the energy stored in the coil $L_1$ is transferred to the output A while the coil current $I_{L1}$ diminishes.

$\Phi_3$: $T_3$ is open, the optional switching means $T_2$ is closed. The coil current $I_{L1}$ now drops faster and flows through the branch having the output B via the diode $D_3$ for a period of time until its output value has again been reached.

During a switching cycle the at least two available outputs A, B are consecutively supplied with power.

Figure 3:
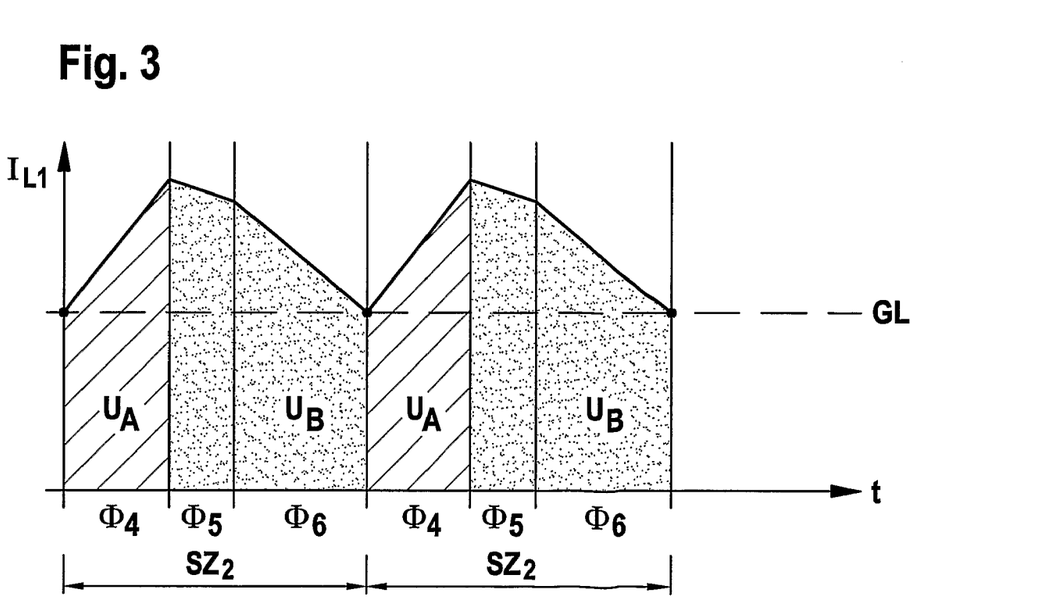
FIG. 3 is a diagram relating to the coil current in accordance with a second variant of a circuit diagram for a buck converter.

FIG. 3 is a diagram which relates to the coil current $I_{L1}$ in accordance with a second variant according to the invention of a circuit diagram for a Buck converter. The second circuit diagram is a second switching cycle $SZ_2$ which comprises an up-conversion phase of the first coil current $I_{L1}$ and a consecutive multiphase (here bi-phase) down-conversion phase where different switching states form the basis during the down-conversion phase, that is to say, here the output is changed over while the main switching means $T_1$ is first kept closed before it is opened in the next switching phase. Here too, the balance line GL is entered, which refers to the adaptation of the duty cycle of the main switching means $T_1$ to the loads. In addition, the converter can only operate in accordance with requirements if the loads have certain marginal requirements. The switching cycle $SZ_2$ represented here comprises a plurality of phases $\Phi_4$, $\Phi_5$ and $\Phi_6$ which correspond to the following states of the switching means $T_1$, $T_2$, $T_3$ and $T_4$.

$\Phi_4$: $T_1$ and $T_3$ are closed and $T_4$ is open. The optional switching means $T_2$ is open. During the up-conversion phase of the coil current $I_{L1}$, also an output having a relatively low output voltage, here output A, is served.

$\Phi_5$: $T_1$ is closed and $T_3$ and $T_4$ are open. The optional switching means $T_2$ is open. Although the main switching means $T_1$ is still closed and thus the circuit arrangement is further supplied with the supply voltage $U_{in}$, there is already a current down-conversion phase, because the load branch is supplied with an output voltage that exceeds the input voltage ($U_B > U_{in}$). The current then diminishes relatively slowly.

$\Phi_6$: $T_1$, $T_{34}$ and $T_4$ are open. The optional switching means $T_2$ is closed. In the second part of the current down-conversion phase the curve declines steeply, because the output voltage $U_B$ is produced only by the energy stored in the coil $L_1$. The electric circuit now comprises the coil $L_1$, the diode $D_3$ in the load branch B, the parallel circuit of a smoothing capacitor and an output resistor representing the load A, and the diode $D_2$ and optionally the switching means $T_2$.

In conclusion, the switching cycle $SZ_1$ or $SZ_2$ of a buck converter comprises according to the invention an up-conversion phase $\Phi_1$ or $\Phi_4$ respectively, and at least two consecutive current down-conversion phases $\Phi_2$ and $\Phi_3$ or $\Phi_5$ and $\Phi_6$, respectively. The diagrams shown in FIG. 2 and FIG. 3 relate to the current up-conversion phases and the current down-conversion phases of an up/down counter which is based on a buck converter and has a main output voltage $U_A$, which is lower than the input voltage $U_{in}$ and whose at least one secondary voltage $U_B$ exceeds the input voltage $U_{in}$. As against the state of the art, the current down-conversion according to the invention is not only caused by switching-off the main switching means $T_1$, but also by supplying a high output voltage. This is achieved in that for each switching cycle $SZ_1$ or $SZ_2$ respectively, a plurality of outputs involved A, B, possibly also C, are operated. The load branch C indicates that according to this diagram also further outputs can be formed, with output voltages (here $U_C$) lying above or below the input voltage $U_{in}$, whereas, however, the condition holds that at the end of a switching cycle $SZ_1$ or $SZ_2$ respectively, the balance GL must be reached. However, a switching cycle may also have a plurality of ON and OFF-phases of $T_1$ and $D_2$.

Figure 4:
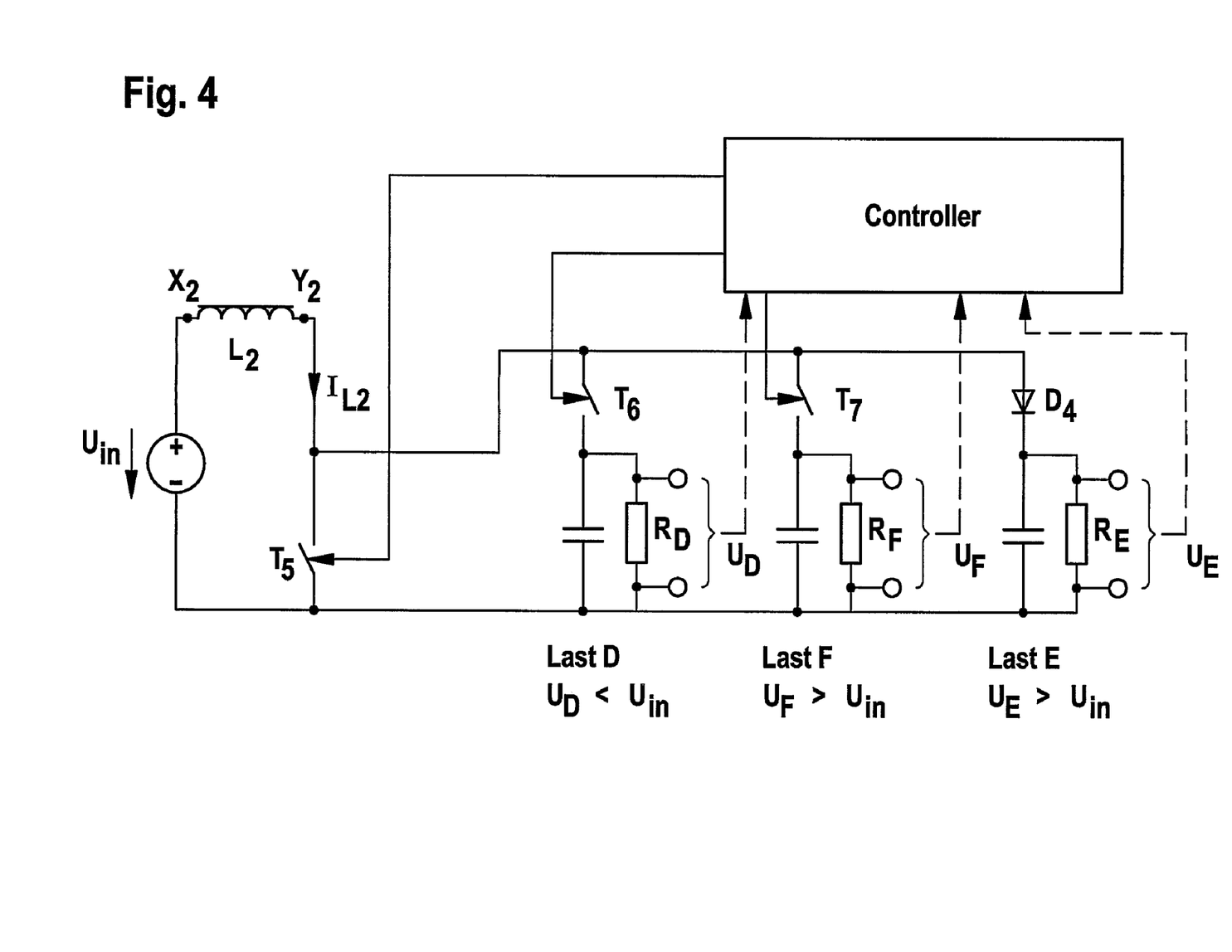
FIG. 4 shows a diagrammatic circuit arrangement for a boost converter.

FIG. 4 shows a diagrammatic circuit arrangement for an up/down counter based on a boost converter. A switching means $T_5$, which is connected between a minus pole of the DC voltage source which generates an input voltage $U_{in}$ and a coil $L_2$ used as an energy storage means, is used as a main switch. The up/down counter shown in this example and having a plurality of outputs has three outputs D, E, and F, the main output having the voltage $U_E$, which exceeds the input voltage $U_{in}$. This main output has a high load. A coil current $I_{L2}$ is produced across the diode $D_4$ in the load branch E as long as the potential $Y_2$ on the side of the coil $L_2$ turned towards the diode $D_4$ is higher than the output voltage $U_E$. There is a secondary voltage available on at least one additional output, here branch D, which is lower than the input voltage $U_{in}$. In this example of embodiment a further output branch is shown having a secondary voltage $U_F$ which exceeds the input voltage $U_{in}$ only in an exemplary fashion. This further secondary voltage $U_F$ could also be lower. A controller monitors the output voltages $U_D$, $U_E$ and $U_F$ and controls the switching means $T_5$, $T_6$ and $T_7$ in accordance with the requirements. It is essential for the invention that already during the up-conversion phase of the coil current $I_{L2}$ the secondary output D is supplied with power.

Figure 5:
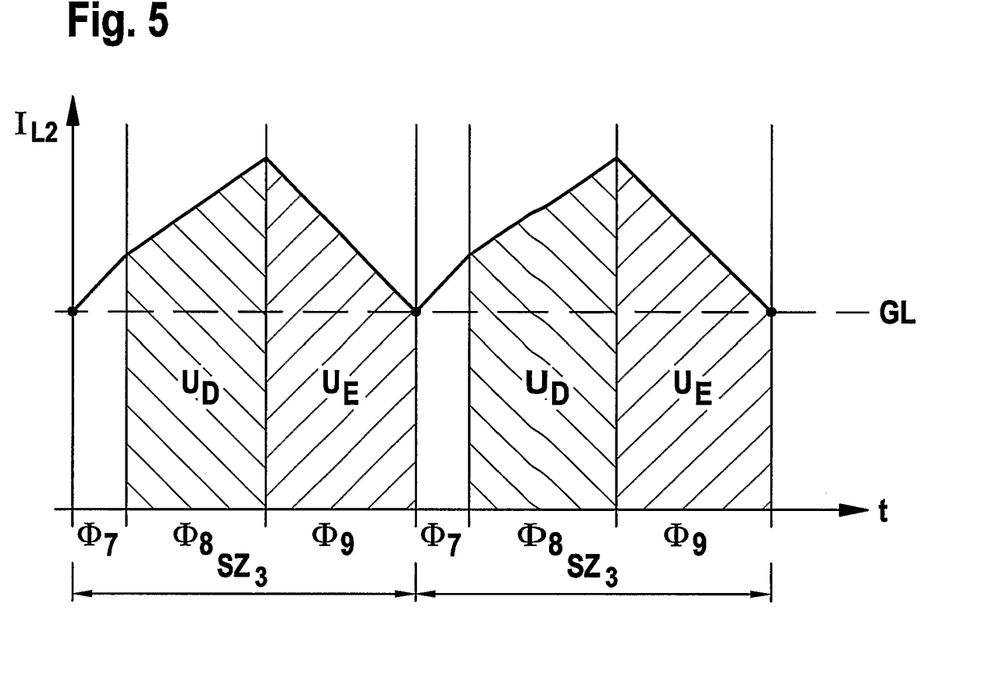
FIG. 5 is a diagram relating to the coil current in accordance with a first variant of a circuit diagram for the boost converter and FIG. 6 is a diagram relating to the coil current in accordance with a second variant of a circuit diagram for a boost converter.

FIG. 5 is a diagram which relates to the coil current $I_{L2}$ in accordance with the first variant according to the invention of a circuit diagram for a buck converter. For the first circuit diagram there is a switching cycle $SZ_3$ consisting of a biphase up-conversion phase of the coil current $I_{L2}$ and at least one consecutive down-conversion phase. The balance line GL indicates that in a state of balance, a correct adaptation of the duty cycle of the main switching means $T_5$ to the loads is achieved. In addition, the operation of the converter according to destination is only possible if the loads have certain marginal requirements. The switching cycle $SZ_3$ represented here comprises a plurality of phases $\Phi_7$, $\Phi_8$ and $\Phi_9$ which correspond to the following states of the switching means $T_5$, $T_6$ and $T_7$:

$\Phi_7$: $T_5$ is closed and $T_6$ and $T_7$ are open. The coil current $I_{L2}$ increases.

$\Phi_8$: $T_6$ is closed and $T_5$ and $T_7$ are open. The coil current $I_{L2}$ increases further, but leveled off compared to the first phase $\Phi_7$, because a consumer was added, that is, a secondary voltage with a low output voltage, here the load branch D with $U_D < U_{in}$.

$\Phi_9$: $T_5$, $T_6$ and $T_7$ are open. The load branch E is supplied with the energy of the inductive storage means $L_2$ via the diode $D_4$.

FIG. 6 is a diagram relating to the coil current $I_{L2}$ in accordance with a second variant of a circuit diagram according to the invention for a boost converter. This example shows the biphase up-conversion phase and the likewise biphase down-conversion phase of the current for a DC/DC converter which has three outputs D, E and F. The current up-conversion phase comprises the phases $\Phi_{10}$ and $\Phi_{11}$, the current down-conversion phase comprises the two phases $\Phi_{12}$ and $\Phi_{13}$. In this example of embodiment each one of the outputs is driven during a switching cycle $SZ_4$.

$\Phi_{10}$: $T_5$ is closed, $T_6$ and $T_7$ are open. Energy is stored in the coil $L_2$.

$\Phi_{11}$: $T_5$ and $T_7$ are open, $T_6$ is closed. The branch D is operated so that the rise of the coil current $I_{L2}$ has a less steep further pattern.

$\Phi_{12}$: $T_5$, $T_6$ and $T_7$ are open, so that the output voltage $U_E$ is generated in the branch E via the diode $D_4$, which output voltage $U_E$ is the main voltage in this boost converter and exceeds the input voltage $U_{in}$.

$\Phi_{13}$: $T_5$ and $T_6$ are open, $T_7$ is closed. Part of the energy stored in the coil $L_2$ is transferred to the output $U_F$.

For the diagrams in the FIGS. 2, 3, 5 and 6 it holds that the shaded surfaces below the line $I_{L1}$ and $I_{L2}$ respectively, represent the current consumption of the respective outputs A, B, C, D, E and F. The circuit diagram shows both the order in which the outputs are served and the respective duration. The same result can also be achieved with a different order in a switching cycle $SZ_i$, when the durations of the phases $\Phi_1$ and $\Phi_2, \ldots, \Phi_{13}$ are adjusted accordingly, so that the sizes of the surfaces remain the same. The controller controls the defined load distribution in that the switching means are set accordingly.

The switching phases and switching cycles shown in the FIGS. 2, 3, 5 and 6 are only examples. When the method according to the invention is used for a DC/DC up-down counter which has more outputs than represented here, it is varied in this respect that, alternatively, a switching cycle is subdivided into a number of switching phases while the balance line GL is taken into account and/or differently structured switching cycles are alternating contrary to the respectively shown individual switching cycle which controls all the available outputs.

The control of the respective main switching means $T_1$ for the buck converter in FIG. 1 or $T_5$ for the boost converter in FIG. 3 respectively, and also of the freewheeling switching means $T_2$ can, with respect to the frequency, be performed irrespective of the control of the output switching means $T_3$, $T_4$, $T_6$ and $T_7$. In this case the behavior can no longer be represented by means of switching phases.

The switching means $D_3$ and $D_4$ may optionally also be replaced by other semiconductor switches (synchronous rectification).

All the voltage sources shown and discussed may also be replaced by voltage sources having reversed polarity when in that case all the diodes are reversed. In general a lower voltage is mentioned when the voltage is closer to zero.

The invention claimed is:

1. A DC/DC up-down converter, comprising:
a DC voltage source configured to provide an input voltage;
first and second outputs configured to output first and second output voltages, respectively;
a main switch coupled to the DC voltage source;
an inductance having a first terminal, coupled to the main switch, and a second terminal, the inductance being configured to provide a coil current;
a first output switch coupled in series with the first output and configured to control a direction of the coil current into the first output or into the second output;
a free-wheeling switch coupled to the DC voltage source and configured to provide current flow in the inductance if the main switch is switched off and
a controller configured to control the main, free-wheeling, and first output switches such that:
the first output voltage is lower than the input voltage;
the second output voltage is higher than the input voltage;
the controller controls the first output switch such that, during one switching cycle, the coil current flows from the second terminal of the inductance into both outputs; and the controller controls the main switch in a transient state of the up-down converter, so that an average voltage on the first terminal of the inductance is equal to a voltage on the second terminal of the inductance.

2. The DC/DC up/down converter as claimed in claim 1 in which the controller is configured to generate switching phases for the switches and the course of the coil current comprises an up-conversion phase and a down-conversion phase, wherein the down-conversion phase of the coil current comprises at least two switching phases.

3. The DC/DC up/down converter as claimed in claim 2, wherein the switching cycle has all the switching phases exactly once.

4. The DC/DC up/down converter claimed in claim 1, wherein the switches are MOSFETs; IGBTs, GTOs or bipolar transistors.

5. The DC/DC up/down converter as claimed in claim 1, further comprising:
a third output configured to produce a third output voltage;
a second output switch connected in series with the third output.

6. A DC/DC up-down converter, comprising:
a DC voltage source configured to provide an input voltage;
first and second outputs configured to output first and second respectively;
an inductance having a first terminal, coupled to the DC voltage source, and a second terminal;
a first output current switch coupled in series with the first output and configured to control a direction of the coil current into the first output or into the second output;
a main switch connected between the second terminal of the inductance and the DC voltage source, and
a controller configured to control the main and first output switches such that:
the first output voltage lower than the input voltage;
the second output voltage exceeds the input voltage;
where the controller is configured to control:
the first output switch so that during one switching cycle the coil current flows from the second terminal of the inductance into both outputs at least once: and
the main switch in a transient state of the up-down converter so that an average voltage on the second terminal of the inductance is equal to a voltage on the first terminal of the inductances, which is equal to the input voltage.

7. The DC/DC up/down converter claimed in claim 6, wherein the controller is configured to generate switching phases for each switch and the coil current has an up-conversion phase and a down-conversion phase, wherein the up-conversion phase of the coil current comprises at least two switching phases.

8. The DC/DC up/down converter as claimed in claim 7, wherein the switching cycle comprises all switching phases, exactly once.

9. The DC/DC up/down converter as claimed in claim 6, further comprising:
a third output configured to produce a third output voltage;
a second output switch connected in series with the third output.

10. A device, comprising:
a first input configured to provide an input voltage;
first and second outputs configured to output first and second output voltages, respectively;
an inductance and configured to provide a coil current;
a first input switch coupled to the inductance;

a first output switch coupled in series with the first output and configured to control a direction of the coil current into the first output or into the second output;

a controller configured to:
control the first output switch such that, during one switching cycle, the coil current flows from a second terminal of the inductance into both outputs, and control the first input switch in a transient state so that an average voltage on the first terminal of the inductance is equal to a voltage on a second terminal of the inductance.

11. The device of claim 10, further comprising:
a third output configured to produce a third output voltage;
a second output switch connected in series with the third output.

12. The device of claim 10, further comprising a DC voltage source configured to provide the input voltage to the first input.

13. The device of claim 12, wherein the inductance has the first terminal directly connected to a first terminal of the DC voltage source and the first input switch is coupled between the second terminal of the inductance and a second terminal of the DC voltage source.

14. The device of claim 12, further comprising a second input switch, the first input switch being coupled between a first terminal of the DC voltage source and the first terminal of the inductance and the second input switch being coupled between a second terminal of the DC voltage source and the first terminal of the inductance.

15. The device of claim 14, wherein the switching cycle has all the switching phases exactly once.

16. The device of claim 11, wherein the controller is configured to generate switching phases for the switches and the course of the coil current comprises an up-conversion phase and a down-conversion phase, wherein the down-conversion phase of the coil current comprises at least two switching phases.

* * * * *

UNITED STATES PATENT AND TRADEMARK OFFICE
CERTIFICATE OF CORRECTION

PATENT NO.        : 7,583,066 B2
APPLICATION NO.   : 10/585059
DATED             : September 1, 2009
INVENTOR(S)       : Tobias Georg Tolle et al.

It is certified that error appears in the above-identified patent and that said Letters Patent is hereby corrected as shown below:

Column 8
Line 14, claim 4, "converter claimed in" should read as --converter as claimed in--.

Lines 25-26, claim 6, "second respectively;" should read as --second output voltages, respectively;--.

Line 29, claim 6, "a first output current switch" should read as --a first output switch--.

Line 36, claim 6, "output voltage lower" should read as --output voltage is lower--.

Line 48, claim 7, "converter claimed in" should read as --converter as claimed in--.

Line 66, claim 10, "inductance and configured to" should read as --inductance configured to--.

Signed and Sealed this

Twenty-ninth Day of June, 2010

David J. Kappos
*Director of the United States Patent and Trademark Office*